(12) United States Patent
Matsumoto et al.

(10) Patent No.: US 10,556,285 B2
(45) Date of Patent: Feb. 11, 2020

(54) METAL JOINED BODY AND MANUFACTURING METHOD FOR METAL JOINED BODY

(71) Applicant: Kobe Steel, Ltd., Kobe-shi (JP)

(72) Inventors: Tsuyoshi Matsumoto, Fujisawa (JP); Yoshihaya Imamura, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 309 days.

(21) Appl. No.: 15/324,177

(22) PCT Filed: Oct. 26, 2015

(86) PCT No.: PCT/JP2015/080125
§ 371 (c)(1),
(2) Date: Jan. 5, 2017

(87) PCT Pub. No.: WO2016/068081
PCT Pub. Date: May 6, 2016

(65) Prior Publication Data
US 2017/0197269 A1 Jul. 13, 2017

(30) Foreign Application Priority Data

Oct. 29, 2014 (JP) .................................. 2014-219989

(51) Int. Cl.
*B23K 1/19* (2006.01)
*B23K 1/16* (2006.01)
(Continued)

(52) U.S. Cl.
CPC ................ *B23K 1/19* (2013.01); *B23K 1/002* (2013.01); *B23K 1/0056* (2013.01); *B23K 1/16* (2013.01);
(Continued)

(58) Field of Classification Search
USPC ........................................................ 219/615
See application file for complete search history.

(56) References Cited

U.S. PATENT DOCUMENTS 3,465,420 A * 9/1969 Webb ...................... C04B 28/26
228/199
5,709,338 A 1/1998 Shirai et al.
(Continued)

FOREIGN PATENT DOCUMENTS

DE 4033457 A1 * 5/1991 ........... B23K 1/0008
JP 8-293670 A 11/1996
(Continued)

OTHER PUBLICATIONS

International Search Report and Written Opinion dated Jan. 26, 2016, in PCT/JP2015/080125, filed Oct. 26, 2015.

*Primary Examiner* — Ibrahime A Abraham
*Assistant Examiner* — Elizabeth M Sims
(74) *Attorney, Agent, or Firm* — Oblon, McClelland, Maier & Neustadt, L.L.P.

(57) ABSTRACT

A metal joined body in which a joint is formed from a first metal member and a second metal member. Brazed joint portions provided intermittently with a brazing material and solder joints filling the spaces between the brazed joint portions with a solder having a fusion point lower than the brazing material, are formed at a seam of the joint. The resulting metal joint has excellent sealing properties and little thermal strain.

14 Claims, 8 Drawing Sheets

(51) Int. Cl.
*B23K 1/002* (2006.01)
*B23K 3/06* (2006.01)
*B23K 31/02* (2006.01)
*B23K 1/005* (2006.01)
*B23K 101/00* (2006.01)

(52) U.S. Cl.
CPC .............. *B23K 3/06* (2013.01); *B23K 31/02* (2013.01); *B23K 2101/006* (2018.08)

(56) References Cited

U.S. PATENT DOCUMENTS

| | | | |
|---|---|---|---|
| 7,329,828 B2 * | 2/2008 | Spriestersbach | B23K 1/0056 219/121.46 |
| 8,319,148 B2 * | 11/2012 | Nowak | B23K 26/0604 219/121.76 |
| 2006/0275623 A1 * | 12/2006 | Takeda | B23K 35/0261 428/653 |
| 2010/0233508 A1 * | 9/2010 | Schneegans | B23K 1/005 428/650 |

FOREIGN PATENT DOCUMENTS

| | | |
|---|---|---|
| JP | 2000-63637 A | 3/2000 |
| JP | 2005-59009 A | 3/2005 |
| JP | 2005-329417 A | 12/2005 |
| JP | 2006-326631 A | 12/2006 |
| JP | 2009-56508 A | 3/2009 |
| JP | 2010-12484 A | 1/2010 |
| JP | 2013-147146 A | 8/2013 |

\* cited by examiner

METAL JOINED BODY AND MANUFACTURING METHOD FOR METAL JOINED BODY

TECHNICAL FIELD

The present invention relates to a metal joined body and a manufacturing method for a metal joined body. In particular, the present invention relates to a metal joined body that has a brazed joint portion and a soldered joint portion at a seam of a joint and a manufacturing method for the metal joined body.

BACKGROUND ART

In joining roof parts such as a roof panel and a roof side rail of a bodywork of an automobile, a spot joining technique has generally been employed. Because two or more parts such as a roof panel and a roof side rail are joined together to form a bodywork, the bodywork usually has joined portions having a U-shape cross section known as Mohican portions by their shape. From the viewpoint of aesthetic of these joined portions, spot weld marks are usually covered with roof molding parts.

Meanwhile, in order to realize what is known as a Mohican-less structure not requiring such roof molding parts, a method has been studied with which a roof part and its peripheral parts are joined continuously rather than by spot joining. Practical application of joining by laser brazing, which involves a relatively low heat input, has also been studied. Moreover, joining by MIG brazing at a low heat input has also been studied.

PTL 1 discloses an example of joining through laser brazing by disclosing an invention related to a laser brazing method with which the decrease in joint strength of a brazing joint due to the laser is suppressed and stabilization of the joint strength is achieved. PTL 2 discloses a technique of joining bodywork parts together by MIG welding, for example.

The braze joining method described above has an advantage in that there is no need to fill gaps with weld sealers after welding unlike in spot welding. However, the braze joining method has a difficulty in putting together a structure with high precision although it involves lower heat strain compared to typical welding. In this respect, there have been proposed a technique (refer to PTL 3) of changing the structure of roof parts, i.e., workpieces, to a structure that undergoes less heat strain in braze joining and a technique (refer to PTL 4) directed to formation of weld beads.

CITATION LIST

Patent Literature

PTL 1: Japanese Unexamined Patent Application Publication No. 2005-59009

PTL 2: Japanese Unexamined Patent Application Publication No. 2010-12484

PTL 3: Japanese Unexamined Patent Application Publication No. 2013-147146

PTL 4: Japanese Unexamined Patent Application Publication No. 2009-56508

SUMMARY OF INVENTION

Technical Problem

However, the technology disclosed in PTL 3 may have a limitation on the design of the structure. Furthermore, employing the technology disclosed in PTL 4 may not be enough to absorb heat strain.

A main object of the present, invention is to provide a metal joined body that has an excellent sealing property and less heat strain and a manufacturing method therefor.

Solution to Problem

A metal joined body according to the present invention includes a joint formed by a first metal member and a second metal member, and brazed joint portions, which are formed of a brazing material and disposed intermittently, and soldered joint, portions, which are formed of a solder having a lower melting point than the brazing material and fill between the brazed joint portions, are formed at a seam of the joint.

The brazed joint portions formed at the seam of the joint may have a stich shape, a dot shape, or a combination of the stich shape and the dot shape.

Surfaces of the brazed joint portions may be covered with the solder.

The first metal member and the second metal member may be formed of dissimilar materials having different melting points.

A method for manufacturing a metal joined body according to the present invention includes a step of forming a joint, by a first metal member and a second metal member; a step of intermittently forming brazed joint portions at a seam of the joint by braze joining with a brazing material; and a step of forming soldered joint portions between the brazed joint portions by using a solder having a lower melting point than the brazing material so that the soldered joint portions fill between the brazed joint portions.

In braze joining with the brazing material, laser brazing or MIG brazing may be employed to form the brazed joint portions.

A solder wire may be used as the solder and the soldered joint portions may be formed by supplying the solder wire to the joint and at the same time irradiating the supplied solder wire with a laser beam.

The solder may be placed between the brazed joint portions intermittently formed at the seam of the joint in the step of forming the brazed joint portions and then the solder may be irradiated with a laser beam to form the soldered joint portions.

The solder may be placed between the brazed joint portions intermittently formed at, the seam of the joint in the step of forming the brazed joint, portions and then the solder may be heated by induction heating to be melted and form the soldered joint portions.

Advantageous Effects of Invention

According to the present invention, it is possible to provide a metal joined body having an excellent sealing property and low heat strain and a manufacturing method therefor.

DESCRIPTION OF EMBODIMENTS

Embodiments of the present invention will now be described in detail with reference to the drawings. In the embodiments below, bodywork parts of an automobile are used as examples. However, the present invention is widely applicable to usage other than bodywork parts since the object is to provide a metal joined body having an excellent sealing property and less heat strain and a manufacturing method therefor, and is thus not limited to the embodiments described below.

A metal joined body according to an embodiment of the present invention is described.

In a metal joined body according to this embodiment, a joint, is formed by a first, metal member and a second metal member, and brazed joint portions, which are formed of a brazing material and disposed intermittently, and soldered joint portions, which are formed of a solder having a lower melting point than the brazing material and fill between the brazed joint portions, are formed at a seam of the joint.

In the description below, an example in which the metal joined body of this embodiment is applied to a structural part of a bodywork of an automobile is described. Specifically, an example in which the first metal member and the second metal member of the metal joined body are respectively a roof panel and a roof side rail of a bodywork is described with reference to FIGS. 1 to 3.

Figure 1:
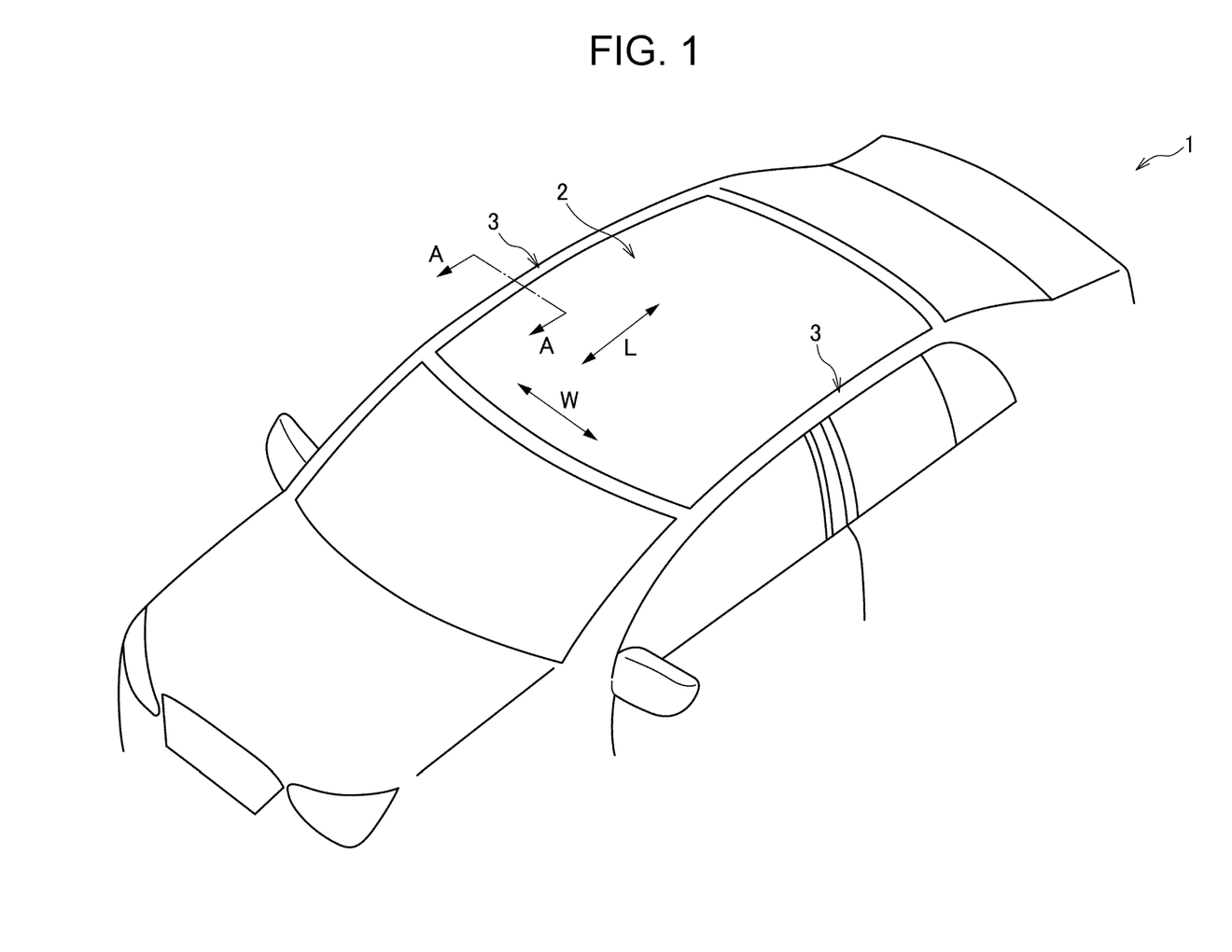
FIG. 1 is a schematic diagram illustrating a roof panel-side structure of a bodywork for describing an example in which a metal joined body according to an embodiment of the present invention is used in the bodywork.
Figure 2:
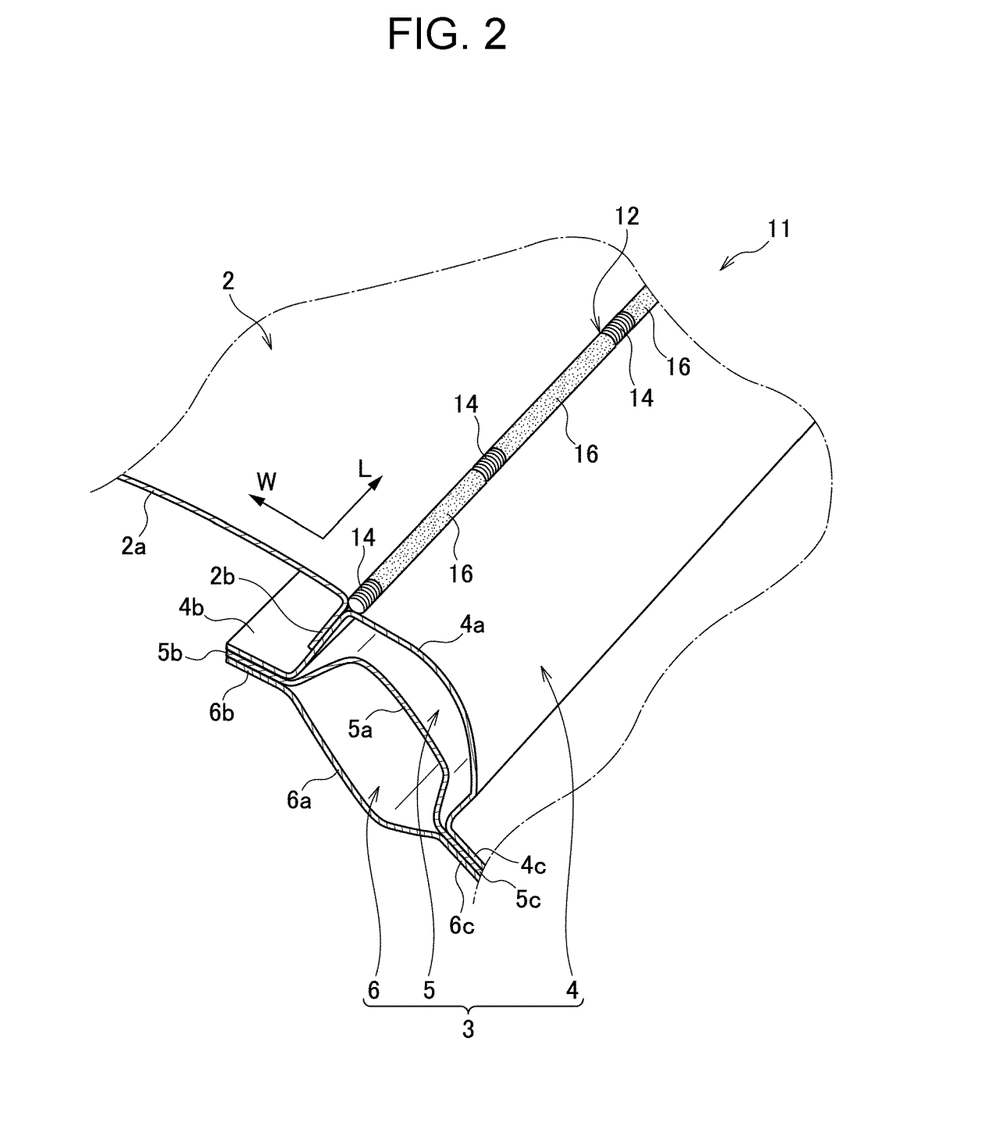
FIG. 2 is an enlarged perspective view taken along line A-A in FIG. 1.
Figure 3A:
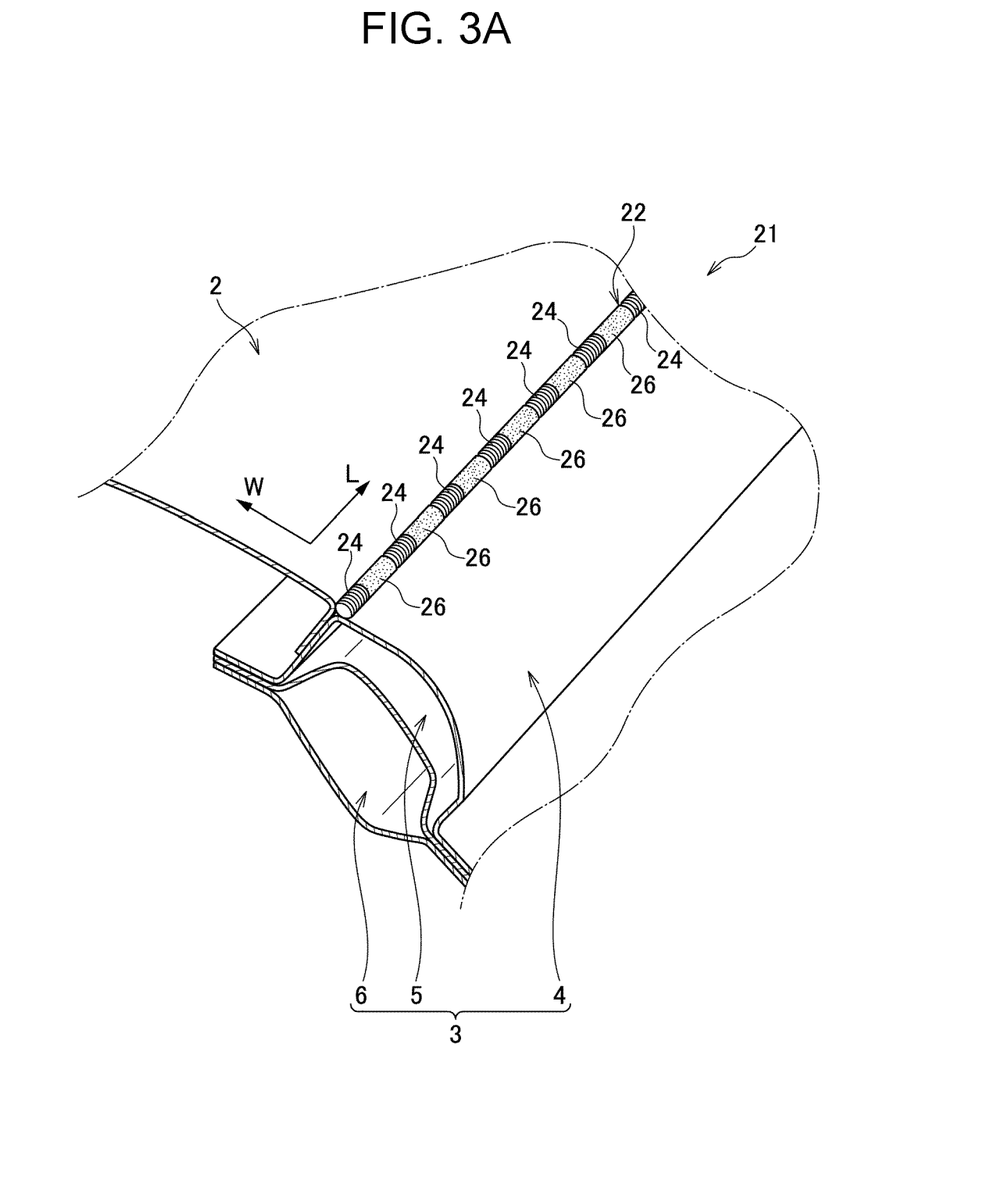
FIG. 3A is a perspective view equivalent to FIG. 2 and illustrates an example structure of a joint portion between a first metal member and a second metal member of a metal joined body according to an embodiment of the present invention, in which brazed joint portions are formed to have a stich shape.
Figure 3B:
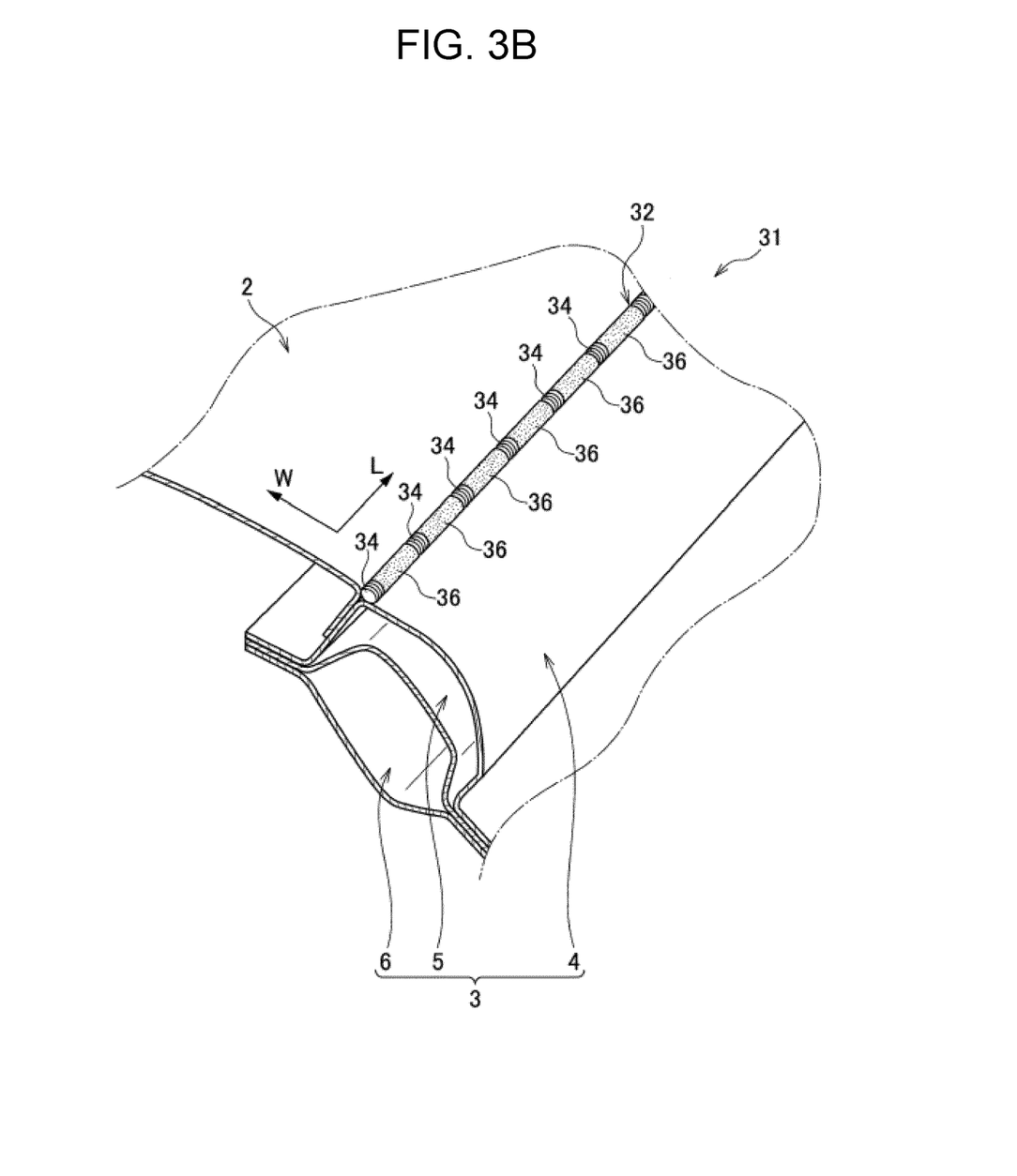
FIG. 3B is a perspective view equivalent to FIG. 2 and illustrates an example structure of a joint portion between the first metal member and the second metal member of a metal joined body according to an embodiment, of the present invention, in which brazed joint portions are formed to have a dot shape.
Figure 3C:
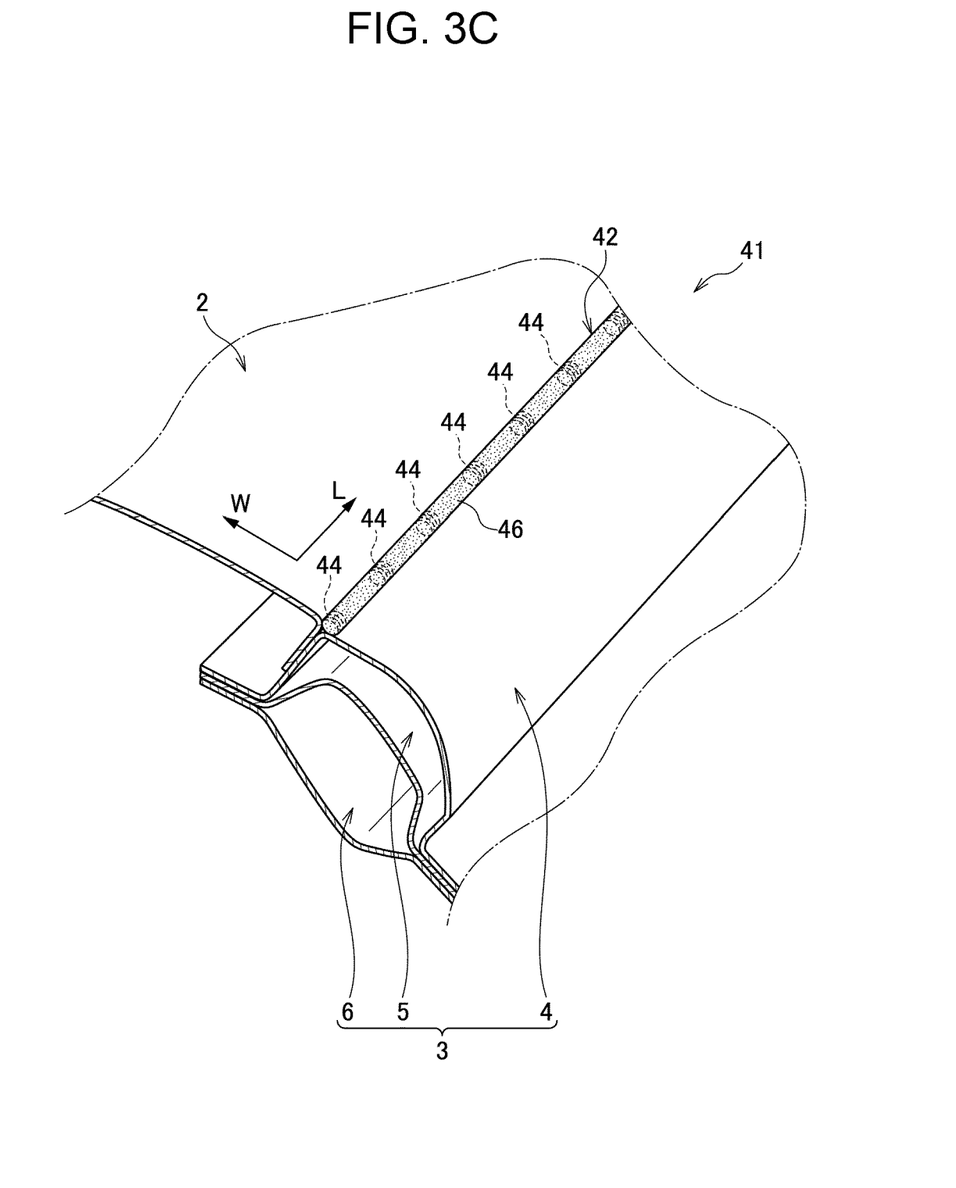
FIG. 3C is a perspective view equivalent to FIG. 2 and illustrates an example structure of a joint portion between the first metal member and the second metal member of a metal joined body according to an embodiment of the present invention, in which surfaces of the brazed joint portions are covered with a solder.

FIG. 1 is a schematic diagram illustrating a structure of a roof panel 2 side of a bodywork 1 for describing an example in which a metal joined body according to this embodiment is used in the bodywork 1. FIG. 2 is an enlarged perspective view taken along line A-A in FIG. 1. FIGS. 3A to 3C are perspective views equivalent to FIG. 2 and illustrate example structures of the joint portion formed by the first metal member and the second metal member of the metal joined body according to this embodiment.

First, an example structure of a bodywork in which the metal joined body of this embodiment is used is described with reference to FIGS. 1 and 2.

As illustrated in FIG. 1, the bodywork 1 includes a roof panel (first metal member) 2 that constitutes a roof of the bodywork 1 and roof side rails (second metal members) 3 disposed on both sides in the bodywork width direction indicated by the arrow W in FIG. 1. The roof side rails 3 are provided in pair on the right and left sides of the bodywork 1 and extend in the longitudinal direction of the bodywork indicated by the arrow L in FIG. 1.

As illustrated in FIG. 2, the roof side rails 3 each include a side outer panel 4, a roof reinforce 5, and a side inner panel 6.

The side outer panel 4 is disposed on the bodywork outer side of the roof reinforce 5. The side inner panel 6 is disposed on the bodywork inner side of the roof reinforce 5. The side outer panel 4 and the roof reinforce 5 form a closed cross section. The side inner panel 6 and the roof reinforce 5 form a closed cross section.

The roof panel 2 is preferably formed of a steel sheet or an aluminum alloy material. The side outer panel 4, the roof reinforce 5, and the side inner panel 6 are each preferably formed of a steel sheet.

The side outer panel 4, the roof reinforce 5, and the side inner panel 6 respectively include main bodies 4a, 5a, and 6a, inner flange portions 4b, 5b, and 6b bent inward in the bodywork width direction W from inner edges of the main bodies 4a, 5a, and 6a, and outer flange portions 4c, 5c, and 6c bent outward and obliquely downward from outer edges of the main bodies 4a, 5a, and 6a. The main body 4a of the side outer panel 4 is formed to have a bulge so that it can cover the main body 5a of the roof reinforce 5 from the bodywork outer side. The main body 5a of the roof reinforce 5 is formed to have a shape of a slightly open hat in a cross section and is disposed to oppose the main body 6a of the side inner panel 6. The main body 6a of the side inner panel 6 is bent so that it protrudes toward the bodywork inner side.

The inner flange portions 4b, 5b, and 6b of the side outer panel 4, the roof reinforce 5, and the side inner panel 6 are superimposed on each other and joined. Similarly, the outer flange portions 4c, 5c, and 6c of the side outer panel 4, the roof reinforce 5, and the side inner panel 6 are superimposed on each other and joined. Since the inner flange portions 4b, 5b, and 6b are joined and the outer flange portions 4c, 5c, and 6c are joined, the closed cross sections of the roof side rail 3 extend in the bodywork longitudinal direction L. The technique for joining the inner flange portions 4b, 5b, and 6b and the outer flange portions 4c, 5c, and 6c is not particularly limited. For example, spot welding may be employed.

The roof panel 2 includes a main body 2a that serves as a roof of the bodywork 1 and a bend portion 2b bent toward the bodywork inner side from the edge of the main body 2a. The bend portion 2b of the roof panel 2 is formed to overlap a part of the main body 4a of the side outer panel 4 that rises from the inner flange portion 4b. The roof panel 2, which is a first metal member, and the roof side rail 3 (side outer panel 4), which is a second metal member, form a joint, and a joint portion 12 is formed at the seam of the joint. Although the shape of the joint is not particularly limited, a flare joint is formed in this embodiment.

Next, structure examples of the joint portion 12 of the roof panel 2, which is the first metal member 2, and the roof side rail 3 (side outer panel 4), which is the second metal member 3, are described with reference to FIGS. 2 and 3A to 3C.

As discussed above, a metal joined body 11 according to the present invention is widely applicable to usage other than the structural parts of the bodywork 1. Thus, in the description below, the roof panel 2 and the roof side rail 3 (side outer panel 4) are referred to by general terms, namely, the first metal member 2 and the second metal member 3.

In the description above, the roof side rail 3 that includes the side outer panel 4, the roof reinforce 5, and the side inner panel 6 is referred to as the second metal member 3; however, since the side outer panel is the member joined to the roof panel 2, which is the first metal member 2, the side outer panel 4 may also be referred to as the second metal member.

As illustrated in FIG. 2, the metal joined body 11 of this embodiment includes brazed joint, portions 14 formed of a brazing material and disposed intermittently and soldered joint portions 16 filling between the brazed joint portions 14 and being formed of a solder having a lower melting point than the brazing material. The brazed joint portions 14 and the soldered joint portions 16 are disposed at a seam of a flare joint of the first metal member 2 and the second metal member 3.

The brazed joint portions 14 can be formed by braze joining using a brazing material. The intermittent arrangement of the brazed joint portions 14 is not limited to one illustrated in FIG. 2. Alternatively, for example, as illustrated in FIG. 3A, brazed joint portions 24 greater in number than the brazed joint portions 14 illustrated in FIG. 2 and arranged in a stich shape can be used. With these stich-shape brazed joint, portions 24, a joint portion 22 of a metal joined body 21 illustrated in FIG. 3A has smaller spaces between the brazed joint portions 24 than the joint portion 12 of the metal joined body 11 illustrated in FIG. 2, and soldered joint portions 26 shorter than the soldered joint portions 16 are disposed between the brazed joint portions 24. The joint strength can be easily increased with this metal joined body 21 since the stich-shape brazed joint portions 24 are provided.

For example, as exemplified by metal joined bodies 31 and 41 illustrated in FIGS. 3B and 3C, brazed joint portions 34 and 44 that are each small in size and formed as dots can be formed in the joint, portions 32 and 42 of the metal joined bodies 31 and 41. Although not illustrated in the drawings, the dot-shape brazed joint portions 34 and 44 and the stich-shape brazed joint portions 24 can be used in combination to form a joint portion.

When the brazed joint portions 14, 24, 34, and 44 are intermittently formed at the joint, of the first, metal member 2 and the second metal member 3, the heat, input of braze joining, which is originally low, can be further lowered. Preferable examples of the techniques of braze joining include MIG spot welding and laser spot welding.

The ends of the joint portions 12, 22, 32, and 42 of the first metal member 2 and the second metal member 3 are preferably formed of brazed joint portions 14, 24, 34, and 44. More preferably, the end portions of the joint of the first metal member 2 and the second metal member 3 are formed of the brazed joint portions 14, 24, 34, and 44. According to this structure, the joint strength of the first metal member 2 and the second metal member 3 can be further increased.

The number, size, positions, etc., of the brazed joint portions 14, 24, 34, and 44 intermittently disposed at the seam of the joint are not particularly limited and are appropriately set so that the first metal member 2 and the second metal member 3 can be securely joined.

The brazing material used in the brazed joint portions 14, 24, 34, and 44 is not particularly limited and may be any material capable of joining the first metal member 2 and the second metal member 3. The brazing material can be appropriately chosen from brazing materials used in existing art according to the materials for the first metal member 2 and the second metal member 3, etc.

For example, when the first, metal member 2 and the second metal member 3 are both formed of aluminum alloy materials, the brazing material (filler metal) used in braze joining can be any of 4043 and 4047 and 1000-series and 5000-series filler metals described in JIS or AA standards. A solid wire or a flux cored wire (FCW) is used as the brazing material (filler metal) in braze joining in this case.

When the first, metal member 2 and the second metal member 3 are both formed of steel materials, a Cu filler metal can be used as the brazing material (filler metal) used in braze joining. In this case, a flux cored wire (FCW) is preferably used as the brazing material (filler metal) used in braze joining from the viewpoint of workability.

It is easy to improve the sealing property of the metal joined bodies 11, 21, 31, and 41 according to this embodiment because of the brazed joint portions 14, 24, 34, and 44 and the soldered joint portions 16, 26, 36, and 46 described below, and thus this embodiment is preferable when the first metal member 2 and the second metal member 3 are formed of dissimilar materials with different melting points. For example, when an aluminum alloy material and a steel material are to be joined, examples of the brazing material (filler metal) used in braze joining include, in addition to 4043, a flux cored wire with an aluminum alloy sheath composed of Si: 1.5 to 2.5% by mass, Ti: 0.15 to 0.25% by mass, and the balance being substantially Al, and a flux charged in the core. The type of flux is not particularly limited but is preferably a flux containing aluminum fluoride ($AlF_3$) or cesium fluoride (CsF) as a main component from the viewpoint of the joint strength. Specifically, when MIG welding is to be conducted, a flux containing $AlF_3$: 7 to 15% by mass as a main component and the balance being substantially potassium aluminum fluoride (KAlF) is preferable. When laser welding is to be conducted, a flux that, contains CsF: 20 to 60% by mass as a main component and the balance being substantially potassium aluminum fluoride (KAlF) is preferable.

As illustrated in FIGS. 2 and 3A to 3C, soldered joint portions 16, 26, 36, and 46 fill between the brazed joint portions 14, 24, 34, and 44 intermittently disposed. Because the soldered joint portions 16, 26, 36, and 46 are provided, the entirety of the joint of the first metal member 2 and the second metal member 3 is joined with the metal. As a result, there is no need to separately place a weld sealer in the gap of the joint of the first metal member 2 and the second metal member 3 and the joint strength between the first metal member 2 and the second metal member 3 can be increased.

When soldered joint portions fill between the brazed joint portions, each soldered joint portion extends continuously from one brazed joint portion to a next brazed joint portion in a plan view taken in a joint direction (bodywork longitudinal direction L). After the brazed joint portions 14, 24, 34, and 44 are intermittently formed, the soldered joint portions 16, 26, 36, and 46 are formed so that the spaces can be efficiently filled.

The soldered joint portions 16, 26, 36, and 46 are formed of a solder having a lower melting point than the brazing material used in the brazed joint portions 14, 24, 34, and 44. Whereas the melting point of the brazing material is about 480° C. to 560° C., the melting point of the solder is about 180° C. to 430° C., which is lower than the melting point of the brazing material. Thus, compared to the case in which the brazing material is used in braze joining, the heat input is significantly reduced even when the soldered joint portions 16, 26, 36, and 46 having a continuous line shape are formed.

The material for the solder used in the soldered joint portions 16, 26, 36, and 46 is not particularly limited. Examples of the material include various solders such as Sn—Ag—Cu solders, Sn—Zn solders, Zn—Sn solders, and Zn—Si solders. A solid wire or a flux cored wire (FCW) is used as the solder. When the solder is a flux cored wire, the sheath material is preferably one of the solder alloys described above and the flux constituting the core is preferably triethanolamine (low temperature range: 180° C. to 260° C.), stannous chloride (middle temperature range: 260° C. to 370° C.), or zinc chloride (high temperature range: 370° C. to 430° C.).

The method for forming the soldered joint portions 16, 26, 36, and 46 is not particularly limited. For example, the soldered joint portions may be formed by performing laser welding while supplying a solder wire to the joint, or the soldered joint portions may be formed by first placing a solder at particular positions on the joint and then melting the solder by laser welding or induction heating to conduct joining. According to these methods for forming the soldered joint portions 16, 26, 36, and 46, the joining speed is significantly increased and the efficiency of producing the metal joined bodies can be increased.

As discussed above, prior to forming the soldered joint portions 16, 26, 36, and 46, the brazed joint portions 14, 24, 34, and 44 are preferably formed on parts of the joint by braze joining. In this manner, strain caused by heat applied during solder joining can be suppressed.

Since solder has excellent polishability, the soldered joint portions 16, 26, 36, and 46 are preferably polished. The polished soldered joint portions 16, 26, 36, and 46 are preferable since the joint portions are less noticeable and aesthetically pleasing. From these viewpoints, as illustrated in FIG. 3C, the soldered joint portion 46 is preferably formed to cover the surfaces of the brazed joint portions 44 and is more preferably formed on substantially all parts of the seam of the joint. Note that the surfaces of the brazed joint portions 14 with relatively large spaces between illustrated in FIG. 2 and the surfaces of the brazed joint portions 24 having a stich shape illustrated in FIG. 3A may also be covered with a solder used for the soldered joint portions 14 and 24.

The material for the first metal member 2 and the second metal member 3, which serve as workpieces, may be any of various combinations described above. Preferable examples of the workpiece include aluminum alloy materials and steel materials.

Examples of the aluminum alloy materials include 5000-series alloys such as 5082, 6000-series alloys such as 6022 and 6011, 3000-series alloys such as 3104, 7000-series alloys, and 2000-series alloys described in JTS or AA standards.

Bare steel sheets (uncoated steel sheets), zinc-coated steel sheets such as GA steel sheets and GI steel sheets, and aluminum-coated steel sheets can be used as the steel material. The base metal of the steel sheet may range from plain steel to high-strength steel such as high-tensile-strength steel.

These workpieces may take a form of a plate, may be an extrusion-molded material, or a combination of a plate member and an extrusion-molded material.

As described in detail above, the metal joined bodies 11, 21, 31, and 41 according to this embodiment have the brazed joint portions 14, 24, 34, and 44 and the soldered joint portions 16, 26, 36, and 46 filling between the brazed joint portions, and these joint portions are formed at the seam of the joint of the first metal member 2 and the second metal member 3. Accordingly, metal joined bodies 11, 21, 31, and 41 that have high joint strength, an excellent sealing property, and significantly less heat strain can be obtained.

Moreover, when the structure is employed in which the surfaces of the brazed joint, portions 44 are covered with a solder used in the soldered joint portion 46, more aesthetically appealing beads can be formed. Since the solder has excellent polishability and grindability, the seam of the joint can be made less noticeable and a metal joined body 41 with excellent design can be obtained.

Next, a method for manufacturing a metal joined body according to this embodiment is described. In the description below, descriptions about the structural examples of the metal workpieces and various materials and the like are omitted to avoid redundancy with the descriptions about the metal joined bodies 11, 21, 31, and 41 presented above.

The method for manufacturing a metal joined body according to this embodiment includes a step of forming a joint by a first metal member and a second metal member (hereinafter this step may be referred to as a "joint forming step"); a step of intermittently forming brazed joint portions at a seam of the joint by braze joining with a brazing material (hereinafter this step may be referred to as a "brazing step"); and a step of forming soldered joint portions between the brazed joint portions by using a solder having a lower melting point than the brazing material so that the soldered joint portions fill between the brazed joint portions (hereinafter this step may be referred to as a "solder joining step")

In this method for manufacturing a metal joined body according to this embodiment, the brazing step and the solder joining step may be performed in any order or simultaneously. Preferably, brazed joint portions are intermittently formed first by performing the braze joining step and then soldered joint portions are formed in the spaces between the brazed joint, portions by performing the solder joining step.

In the joint forming step, a first metal member and a second metal member are put together to form a joint. In this embodiment, a flare joint is given as an example, as described above. Here, the first metal member and the second metal member may be formed of metal materials of the same type or metal materials of different types with different melting points. When the first metal member and the second metal member are formed of metal materials of the same type, the metal materials may have the same composition or different compositions.

The first metal member and the second metal member may have a plate shape. Alternatively, one or both of the metal members may be formed into various other shapes. When pre-molded members are used as the first metal member and the second metal member, the molding method is not particularly limited. For example, a press-molded member, an extrusion-molded member, a casting, or any of other various molded products can be used.

In the brazing step, brazed joint portions can be formed by braze joining with a brazing material, for example, laser brazing or MIG brazing.

In the solder joining step, soldered joint portions can be formed by supplying a solder wire to the joint and at the same time irradiating the solder wire with a laser beam.

The soldered joint portions can also be formed by placing a solder in spaces between the brazed joint portions intermittently formed at the seam of the joint in the brazing step, and then irradiating the solder with a laser beam.

Alternatively, a solder may be placed in spaces between the brazed joint portions intermittently formed at the seam of the joint in the brazing step and may be heated and melted by induction heating to form the soldered joint portions.

The brazing step and the solder joining step will now be specifically described with reference to FIGS. 4 to 7. FIGS. 4 to 7 are diagrams illustrating representative examples of the method for manufacturing a metal joined body, which can be applied to manufacturing the metal joined bodies 11, 21, 31, and 41 according to the embodiment described above.

In FIGS. 4 to 7, the roof side rail (second metal member) 3 is illustrated as one second metal member 3 without illustrating a side outer panel, a roof reinforce, and a side inner panel for the sake of simplicity. The shapes of the second metal member 3 and the roof panel (first metal member) 2 are also simplified in the drawings.

Figure 4:
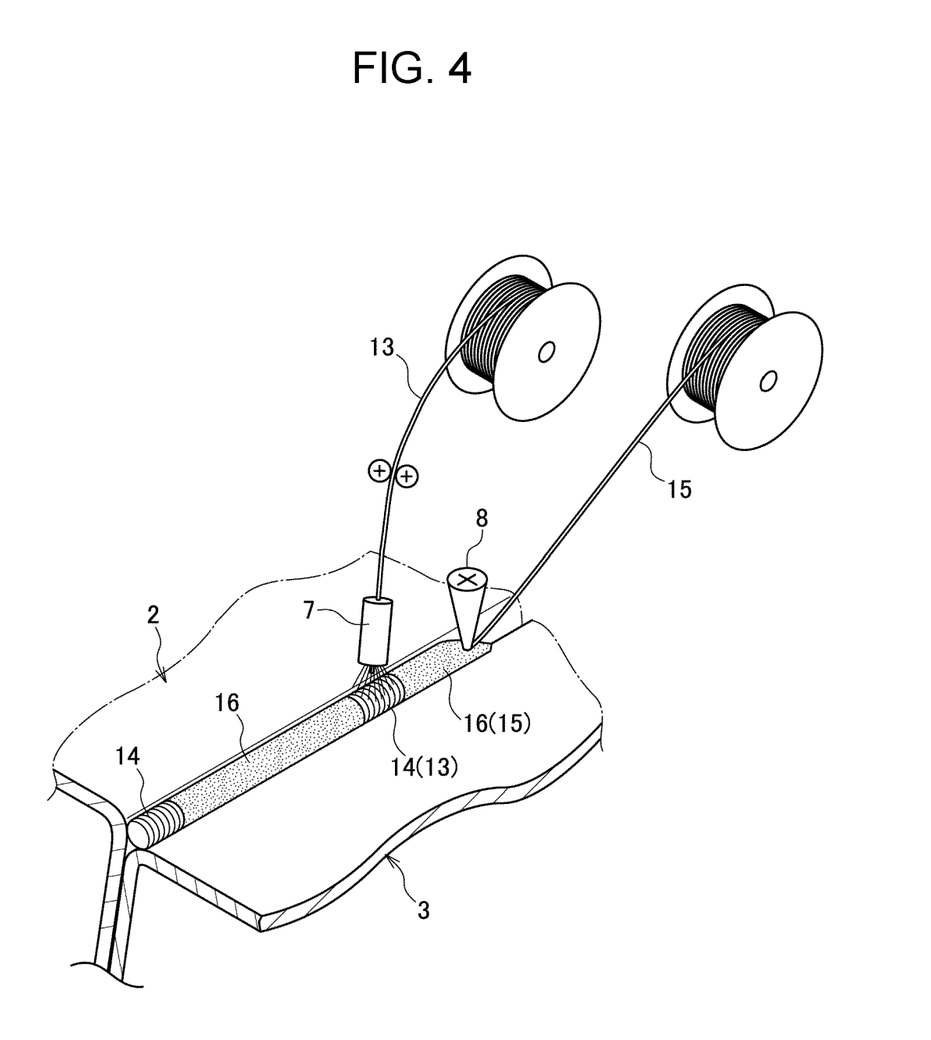
FIG. 4 is a diagram illustrating a first example of a method for manufacturing a metal joined body according to an embodiment of the present invention.

FIG. 4 is a diagram illustrating a first example of the method for manufacturing a metal joined body according to this embodiment and the diagram illustrates manufacturing the metal joined body 11 of the embodiment described above. As illustrated in FIG. 4, according to the first example of the manufacturing method, brazed joint portions 14 and soldered joint portions 16 are formed in tandem. In other words, in the manufacturing method of this example, formation of the brazed joint portion 14 and formation of the soldered joint portions 16 are conducted simultaneously so as to form one joint portion 12. More preferably, while a wire brazing material 13 used for the brazed joint portions 14 is being supplied to the seam of the joint, a solder wire 15 used in the soldered joint portions 16 is supplied following the supply of the brazing material 13 so as to come next to the brazing material 13.

In braze joining with a wire-shape brazing material 13 conducted in the brazing step of the manufacturing method of this example, brazed joint, portions 14 are formed by supplying the wire-shape brazing material 13 to the joint and at the same time conducting MIG spot welding (MIG brazing) using a weld torch 7. The MIG spot welding technique may be a common MIG welding technique or a cold metal transfer (CMT) welding technique.

In the solder joining step of the manufacturing method of this example, the solder wire 15 is supplied following the brazed joint portion 14 and at the same time irradiated with a laser beam 8 so as to form a soldered joint portion 16, thereby forming soldered joint portions 16 in the spaces between the brazed joint portions 14 at the seam of the joint.

Various types of laser can be used for the laser beam 8 used in the solder joining step, examples of which include a fiber laser, a disk laser, a semiconductor laser, a YAG laser, and a $CO_2$ laser. By employing a remote system using a scanner, joining can be conducted significantly speedily and efficiently. In conducting laser joining, the laser beam 8 is preferably defocused relative to the solder. In this manner, not only the solder but also the workpiece is heated, the flowability of the solder is improved, and thus the joint strength can be increased.

Figure 5:
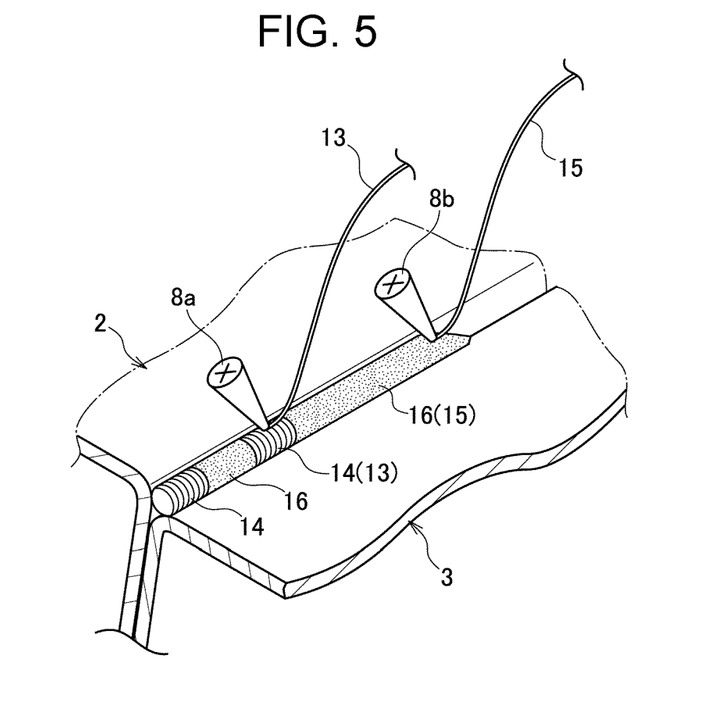
FIG. 5 is a diagram illustrating a second example of a method for manufacturing a metal joined body according to an embodiment of the present invention.

FIG. 5 is a diagram illustrating a second example of the method for manufacturing a metal joined body according to this embodiment and illustrates formation of the metal joined body 11 according to the embodiment described above. As illustrated in FIG. 5, the manufacturing method of this example involves forming both the brazed joint portions 14 and the soldered joint portions 16 by laser beam irradiation. Specifically, while a wire-shape brazing material 13 is supplied to the joint of the first metal member 2 and the second metal member 3, the brazing material 13 is irradiated with a first laser beam 8a so as to form brazed joint portions 14. Following the brazed joint portions 14, a solder wire 15 is supplied to the joint and irradiated with a second laser beam 8b so as to form soldered joint portions 16. The laser beams 8a and 8b are preferably defocused as in the case described above.

Figure 6:
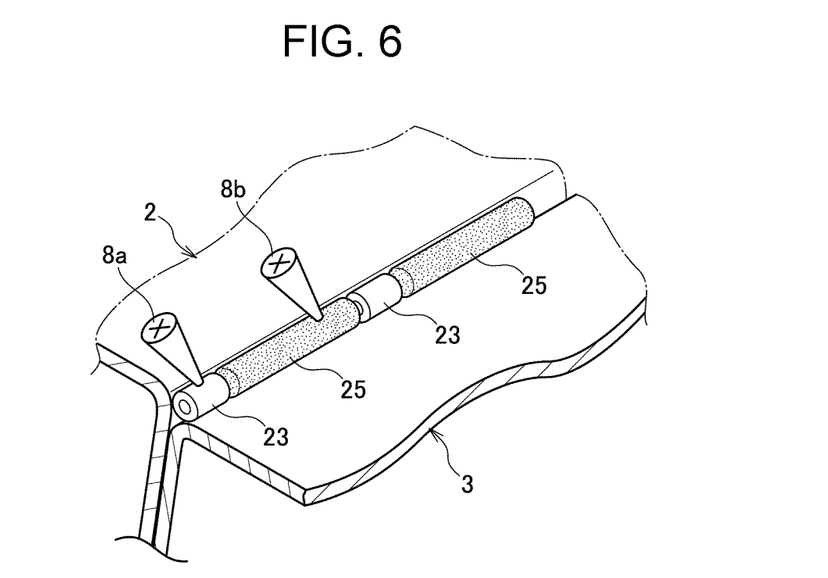
FIG. 6 is a diagram illustrating a third example of a method for manufacturing a metal joined body according to an embodiment of the present invention.

FIG. 6 is a diagram illustrating a third example of the method for manufacturing a metal joined body according to this embodiment. As illustrated in FIG. 6, in the manufacturing method of this example, line-shape brazing materials 23 and line-shape solders 25 are first placed at particular positions on the seam of the joint of the first metal member 2 and the second metal member 3. Then while the brazing materials 23 and the solders 25 are at the particular positions on the seam of the joint, the brazing materials 23 and the solders 25 are irradiated with a first laser beam 8a and a second laser beam 8b, respectively. As a result, the brazing materials 23 and the solders 25 melt due to the laser beam and form brazed joint portions and soldered joint portions.

According to the manufacturing method of the third example, a wire supplying device that can supply wires (wires of brazing materials and solders) according to the working conditions need not be provided and thus a metal joined body can be manufactured with a simpler facility.

According to the manufacturing method of this example, laser beams 8a and 8b are simply applied to the brazing materials 23 and the solders 25 placed at particular positions on the seam of the joint of the first metal member 2 and the second metal member 3; thus, the brazed joint portions and the soldered joint portions can be formed simultaneously by this manufacturing method. As a result, the efficiency of producing metal joined bodies can be increased.

Figure 7:
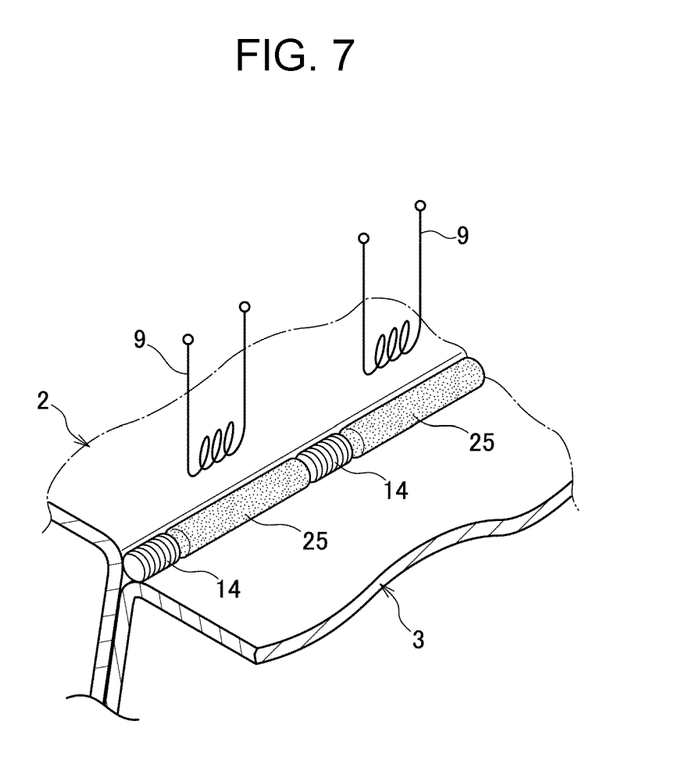
FIG. 7 is a diagram illustrating a fourth example of a method for manufacturing a metal joined body according to an embodiment of the present invention.

FIG. 7 is a diagram illustrating a fourth example of the method for manufacturing a metal joined body according to this embodiment. As illustrated in FIG. 7, in the manufacturing method of this example, brazed joint portions 14 are formed at the seam of the joint of the first metal member 2 and the second metal member 3 and then line-shape solders 25 are placed between the brazed joint, portions 14 and heated and melted by using an induction heater 9 so as to form soldered joint portions. Although FIG. 7 illustrates a state in which brazed joint portions 14 have already been formed, the brazed joint portions can be formed by using a line-shape brazing material and the induction heater 9 as with forming the soldered joint portions in this example. Alternatively, the brazed joint portions 14 can be formed by the same manufacturing method as the first to third example.

According to the manufacturing method of the fourth example, soldered joint portions 25 can be formed by simultaneously heating the joining sites by using a simple induction heater 9. Thus, productivity can be further increased.

In the manufacturing methods of the examples described above, it is also possible to form soldered joint portions by forming brazed joint portions first and then form soldered joint portions by melting, by laser beam irradiation, a solder already placed on the brazed joint portions or at the same time as supplying a solder having a wire shape onto the braze joints. In this manner, the surfaces of the brazed joint portions can be covered with the solder and aesthetically pleasing beads can be formed (refer to FIG. 3C). Furthermore, after the soldered joint portions are formed, the surfaces of the soldered joint portions are polished so that a more aesthetically pleasing appearance can be obtained.

In the manufacturing methods described above, the conditions for welding and laser irradiation are not particularly limited and can be set appropriately depending on the shape, dimensions, structure, materials, etc., of the first metal member 2 and the second metal member 3.

When an aluminum alloy material is to be joined to an aluminum alloy material or a steel material is to be joined to a steel material, conditions for forming brazed joint portions by MIG spot welding are, for example, a weld current in the range of 60 to 120 A (90 A in a preferable example) and a voltage in the range of 10 to 30 V (19 V in a preferable example). In such a case, conditions for forming brazed joint portions by using a laser beam (laser spot welding) are, for example, power of about 1 to 5 kW (3.5 kW in a preferable example) and a beam size of about 0.5 to 5 mm (2 mm in a preferable example). In such a case, the conditions for forming soldered joint portions by using a laser beam are, for example, power of about 1 to 5 kW (1.5 kW in a preferable example), a feed rate of about 1 to 5 m/m (2 m/m in a preferable example), and a beam size of about 0.5 to 5 mm (2 mm in a preferable example).

In the case of dissimilar joining of an aluminum alloy material and a steel material, conditions for forming brazed joint portions by MIG spot welding are, for example, a weld current in the range of 50 to 110 A (80 A in a preferable example) and a voltage in the range of 10 to 30 V (17 V in a preferable example). In such a case, conditions for forming brazed joint portions by using a laser beam (laser spot welding) are, for example, power of about 1 to 5 kW (3 kW in a preferable example) and a beam size of about 0.5 to 5 mm (2 mm in a preferable example). Furthermore, in this case, conditions for forming soldered joint portions by using a laser beam are, for example, power of about 1 to 5 kW (1.5 kW in a preferable example), a feed rate of about 1 to 5 m/m (2 m/m in a preferable example), and a beam size of about 0.5 to 5 mm (2 mm in a preferable example).

As described in detail above, according to the method for manufacturing a metal joined body according to this embodiment, brazed joint portions are formed by a brazing step at, a seam of a joint, of the first metal member and the second metal member and soldered joint portions are formed in the spaces between the brazed joint portions at the seam by performing a solder joining step. According to this manufacturing method, braze joining is conducted by using a brazing material to spot-join some parts and then a solder having a lower melting point than the brazing material is supplemented in the spaces between the brazed joint portions formed by spot joining; hence, a metal joined body that has significantly low heat strain and high joint strength and sealing property can be obtained.

Moreover, according to the manufacturing method of this embodiment, since soldered joint portions are formed by using a laser beam, high-speed joining can be performed at low heat input. Thus, the joining time can be shortened, there is less adjustment for strain, and the efficiency of producing metal joined bodies can be dramatically improved.

The metal joined body and the manufacturing method for the metal joined body according to this embodiment can also have the following features instead of the features described above.

In the above-described embodiment, the shape of the joint formed of the first metal member 2 and the second metal member 3 is a flare joint. However, the shape of the joint is not limited to this. For example, the joint of the first metal member and the second metal member of the metal joined body according to the present invention may take other joint forms, such as a butt joint, a lap joint, a corner joint, an edge joint, and a T joint.

In the embodiment described above, the metal joined body used in roof parts of bodyworks of automobiles has been described as an example. However, the metal joined body according to the present invention is applicable to parts of doors, fenders, etc., of automobiles. Moreover, the present invention has applicability to metal joined bodies used in not only the automobile industry but also various industrial fields including the construction industry, shipbuilding industry, rail industry, and aerospace industry.

REFERENCE SIGNS LIST

1 bodywork
2 roof panel (first metal member)
3 roof side rail (second metal member)
4 side outer panel
5 roof reinforce
6 side inner panel
11, 21, 31, 41 metal joined body
12, 22, 32, 42 joint portion
13, 23 brazing material
14, 24, 34, 44 brazed joint portion
15, 25 solder
16, 26, 36, 46 soldered joint portion
7 weld torch
8, 8a, 8b laser beam
9 induction heater

The invention claimed is:
1. A metal joined body comprising:
a joint formed by a first metal member and a second metal member,
wherein brazed joint portions, which are formed of a brazing material and disposed intermittently to form gaps between the brazed joint portions, and soldered joint portions, which are formed of a solder having a lower melting point than the brazing material and fill the naps between the brazed joint portions, are formed at a seam of the joint.

2. The metal joined body according to claim 1, wherein the brazed joint portions formed at the seam of the joint have a stich shape, a dot shape, or a combination of the stich shape and the dot shape.

3. The metal joined body according to claim 1, wherein surfaces of the brazed joint portions are covered with the solder.

4. The metal joined body according to claim 1, wherein the first metal member and the second metal member are formed of dissimilar materials having different melting points.

5. The metal joined body according to claim 1, wherein the brazed joint portions and soldered joint portions together form a continuous line shape.

6. A method for manufacturing a metal joined body, comprising:
forming a joint by a first metal member and a second metal member;

intermittently forming brazed joint portions at a seam of the joint by braze joining with a brazing material such that gaps are formed between the brazed joint portions; and forming soldered joint portions between the brazed joint portions by using a solder having a lower melting point than the brazing material so that the soldered joint portions fill in the gaps between the brazed joint portions.

7. The method for manufacturing a metal joined body according to claim 6, in braze joining with the brazing material, laser brazing or MIG brazing is employed to form the brazed joint portions.

8. The method for manufacturing a metal joined body according to claim 7, wherein a solder wire is used as the solder and the soldered joint portions are formed by supplying the solder wire to the joint and at the same time irradiating the supplied solder wire with a laser beam.

9. The method for manufacturing a metal joined body according to claim 7, wherein the solder is placed between the brazed joint portions intermittently formed at the seam of the joint in forming the brazed joint portions and then the solder is irradiated with a laser beam to form the soldered joint portions.

10. The method for manufacturing a metal joined body according to claim 7, wherein the solder is placed between the brazed joint portions intermittently formed at the seam of the joint in forming the brazed joint portions and then the solder is heated by induction heating to be melted and form the soldered joint portions.

11. The method for manufacturing a metal joined body according to claim 6, wherein a solder wire is used as the solder and the soldered joint portions are formed by supplying the solder wire to the joint and at the same time irradiating the supplied solder wire with a laser beam.

12. The method for manufacturing a metal joined body according to claim 6, wherein the solder is placed between the brazed joint portions intermittently formed at the seam of the joint in forming the brazed joint portions and then the solder is irradiated with a laser beam to form the soldered joint portions.

13. The method for manufacturing a metal joined body according to claim 6, wherein the solder is placed between the brazed joint portions intermittently formed at the seam of the joint in forming the brazed joint portions and then the solder is heated by induction heating to be melted and form the soldered joint portions.

14. The method for manufacturing a metal joined body according to claim 6, wherein the brazed joint portions and soldered joint portions together form a continuous line shape.

* * * * *